UNITED STATES PATENT OFFICE 2,364,639

TREATMENT OF VITAMIN EXTRACTS

Ben Maizel, Chicago, Ill., assignor to Vico Products Company, Chicago, Ill.

No Drawing. Application April 11, 1940, Serial No. 329,055

8 Claims. (Cl. 167—81)

My invention relates to the treatment of vitamin extracts and is particularly concerned with the treatment of aqueous solutions of the vitamin B complex derived from brewer's yeast.

It has heretofore been proposed to prepare extracts of the vitamin B complex from yeast by means of water as well as through the use of organic solvents such as ethyl and methyl alcohol as extracting media. The use of organic solvents as extracting media, while economically feasible, has resulted, as heretofore carried out, in the production of products which are characterized by a bitter taste and marked hygroscopicity.

In my Patent No. 2,193,876, issued March 19, 1940, I have disclosed a method for removing the bitter taste from vitamin extracts in a highly effective manner. In accordance with the procedures described in said patent, an acidulated alcohol-water extract of brewer's yeast, or other liquid extracts of the vitamin B complex, is evaporated under reduced pressure to a syrupy consistency. Upon standing, a portion of the impurities, in the form of gummy constituents, separate out and may be removed, for example, by settling procedures. As described in said patent, I have found that such gummy material, the nature of which is not fully known to me, imparts bitter taste, dark color, and other undesirable characteristics to the vitamin B complex.

I have now discovered that vitamin extracts, particularly of the character referred to hereinabove, may be still further improved with respect to removal of undesirable tastes and flavors by certain procedures hereinafter described. My new and improved method may be employed, for example, either on the material resulting from the processes described in my prior patent, referred to hereinabove, that is, the vitamin complex solution obtained after the removal of the gummy constituents, or it may be used in connection with the treatment of vitamin extracts derived from other processes and which have undesirable constituents, possessing acid-like properties, which impart objectionable taste and flavor to said vitamin extracts.

I have discovered that the evil or objectionable tasting substances present in vitamin extracts, particularly aqueous extracts or aqueous-organic solvent extracts of the vitamin B complex of brewer's yeast, may be removed by a selective adsorption action while leaving intact in the solution all or substantially all of the vitamin content originally present therein.

I have also discovered an improved method for regenerating the materials which are used to selectively adsorb the undesirable tastes and flavors whereby said adsorptive material may be utilized repeatedly with a high degree of efficiency.

In general, my invention involves the utilization of certain highly selective adsorbing agents which have an attraction for acidic or anionic substances. I have found that the objectionable or evil tasting substances usually accompanying the vitamin B complex, particularly when the latter is derived by a water-organic solvent extraction of brewer's yeast, possess acid-like characteristics or behave as if they possess acidic properties. The adsorbing agents which I employ are of a character which adsorb these acid-like substances without, however, appreciably decreasing the vitamin content of the extract. The adsorbing agents which I have found to be particularly effective are disclosed, for example, in United States Patent No. 2,106,486; Canadian Patent No. 368,562; British Patent No. 450,309; and French Patent No. 796,797. In general, the preferred adsorbing agents comprise resins which are prepared by condensing nitrogenous bodies, for example, phenylene diamine or protein derivatives or the like, with carbohydrates or with aldehydes such as formaldehyde. Such adsorbing agents may comprise bodies of varying chemical constitution, but, in all cases, they must have the property of possessing a specific attraction for acidic or anionic substances such as are characterized by the constituent or constituents which impart objectionable or evil tastes to vitamin preparations.

While the practice of the invention may be effected in various forms, the following example represents a preferred embodiment of the invention, it being clearly understood, however, that the example is to be construed in an illustrative manner rather than as a limitation of the invention:

A bed of a resinous adsorbing agent, for example, such as is sold under the trade names "Nalcite" and "Demineralite," is preliminarily washed with water so that the water passed through such bed, prior to the beginning of the treatment proper of the vitamin extracts, has a pH less than 7, or, in other words, so that the amount of alkali or alkaline material in the bed is so small that only a minor fraction of the liquid vitamin extract which is subsequently passed through the bed is rendered alkaline. The purpose of the water washing operation is to insure that the pH of the entire batch of the treated vitamin extract is sufficiently acid to protect vitamin fractions which may be sensitive to alkalinity against decomposition. After the bed of the adsorbing material has been suitably pretreated by washing with water, the liquid vitamin extract, for example, that resulting from the practice of the invention of my prior Patent No. 2,193,876, suitably freed of suspended material, is slowly percolated through the bed of said adsorbing material. By this treatment, it is possible to begin with a liquid vitamin extract having a pH, as measured by the Beckman glass electrode potentiometer, of 3 to 4 and obtain a treated liquid vitamin extract having a pH of 4.5 to 6. It should be noted that this effect is produced solely by removal of acid-like substances rather than, for example, by neutralization through the addition of basic or alkaline substances. It should also be noted that the change in the pH is effected without having at any time a local excess of basic material.

If desirable, the bed may preliminarily be charged with a weak acid ion, for example, by passing through said bed of adsorbing material an aqueous solution of sodium acetate or other salt of a strong base and a weak acid. In such case, when the vitamin extract is passed through the bed of the adsorbing material, the change of pH of said extract will be smaller.

After passage of the liquid vitamin extract through the bed of adsorbing material, the vitamin bearing liquid issuing from the bed may be concentrated or dried in any well known manner. It has been found that the dried extract obtained after such treatment is less hygroscopic than dried extracts which have not undergone treatment in accordance with the process of my invention. The exact reason for this has not been fully ascertained but it appears that since many of the vitamin B extracts are rich in protein-like materials, said protein-like materials appear to dry in the form of a jell rather than as a coagulated mass in the absence of a large excess of acid ions. The result is that the hygroscopic substances present in the dried extract are protected by a jell-like film from exposure to air.

I have also found an effective method for regenerating the bed of adsorbing material for repeated use. I have noted that some of the materials which are adsorbed from the vitamin extracts, for example, from the extract containing the vitamin B complex of brewer's yeast, are only slowly soluble in alkalies so that, in order thoroughly to regenerate the bed it is necessary to wash it with an excessive quantity of alkali, a procedure which, for various reasons, is highly undesirable. I have discovered, however, that the adsorbed materials in the bed which are relatively insoluble in alkalies are, nevertheless, very easily eluted from the bed by organic solvents which are readily miscible with or soluble in water, for examples, alcohol, acetone, isopropyl alcohol, dioxane, and the like. This elution may be carried out even when the bed is in an acidic state so that, if necessary or desirable, traces of alkali-sensitive vitamin B which remain adsorbed in the bed even after prolonged washing with water may easily be removed by treating the bed of adsorbing material with water miscible organic solvents and the vitamin content subsequently recovered from the solutions thus obtained.

In some instances, it has been found desirable, in the regeneration of the bed, to wash the same with water-immiscible solvents such as ethylene dichloride, petroleum ether, benzene and the like, after said bed has been treated with the water miscible organic solvents. In this event, the water immiscible solvent should, in turn, be displaced with a water miscible solvent previous to the next step in the regeneration cycle. After the elution with the organic solvents has been completed, the remaining adsorbed material in the bed may be removed by treating the bed with a dilute aqueous solution of an alkaline material, for example, carbonates, bicarbonates, or hydroxides of elements of the first group of the periodic table. The excess alkaline material is then washed out preferably with a zeolite-treated water which may or may not contain a trace of acid, as desired. This completes the regeneration operation and the bed is then ready for the treatment of additional liquid vitamin extracts.

What I claim as new and desire to protect by Letters Patent of the United States is:

1. A method of treating aqueous extracts of the vitamin B complex of brewer's yeast to remove acid-like constituents which impart objectionable taste to said extracts, which comprises contacting said extracts with a synthetic resin having the property of adsorbing said acid-like constituents, whereby the latter are selectively adsorbed without materially decreasing the vitamin content of said extracts.

2. A method in accordance with claim 1 wherein the synthetic resin comprises one derived from an aldehyde and a nitrogenous substance.

3. A method in accordance with claim 1 wherein the synthetic resin is of such a character that water, after passage through a bed thereof, has a pH not over 7.0.

4. A method of treating aqueous-alcohol extracts of the vitamin B complex of brewer's yeast to remove acid-like constituents which impart objectionable taste to said extracts, which comprises contacting said extracts with a synthetic resin having the property of adsorbing said acid-like constituents, whereby the latter are selectively adsorbed without materially decreasing the vitamin content of said extracts, said synthetic resin being derived from phenylene diamine and formaldehyde.

5. A method of treating aqueous extracts of the vitamin B complex of brewer's yeast to remove acidic constituents which impart objectionable taste to said extracts, which comprises contacting said extracts with a synthetic resin having the property of adsorbing said acidic constituents, whereby the latter are selectively adsorbed without materially decreasing the vitamin content of said extracts, said synthetic resin comprising one derived from an aldehyde and an aromatic polyamine.

6. A method of treating aqueous extracts containing water-soluble vitamins of the B group to remove constituents therefrom which impart objectionable taste to said extracts and which possess an acidic character, which comprises contacting said extracts with an adsorbing agent to selectively adsorb said undesired constituents without materially decreasing the vitamin content of said extracts, said adsorbing agent comprising a synthetic resin derived from phenylene diamine and formaldehyde.

7. A method of treating aqueous-alcohol extracts of the vitamin B complex of brewer's yeast to remove acidic constituents which impart objectionable taste to said extracts, which comprises contacting said extracts with a synthetic resin having the property of adsorbing said acidic constituents, whereby the latter are selectively adsorbed without materially decreasing the vitamin content of said extracts, said synthetic resin comprising one derived from an aldehyde and an aromatic polyamine, said resin being of such character that water, after passage through a bed thereof, has a pH not over 7.0.

8. A method of treating aqueous extracts containing water-soluble vitamins of the B group to remove constituents therefrom which impart objectionable taste to said extracts and which possess an acid-like character, which comprises contacting said extracts with an adsorbing agent to selectively adsorb said undesired constituents without materially decreasing the vitamin B content of said extracts, said adsorbing agent comprising a synthetic resin.

BEN MAIZEL.